Aug. 15, 1961  E. R. BURTNETT  2,995,954
POWER TRANSMITTING MECHANISM
Filed March 9, 1956  3 Sheets-Sheet 1
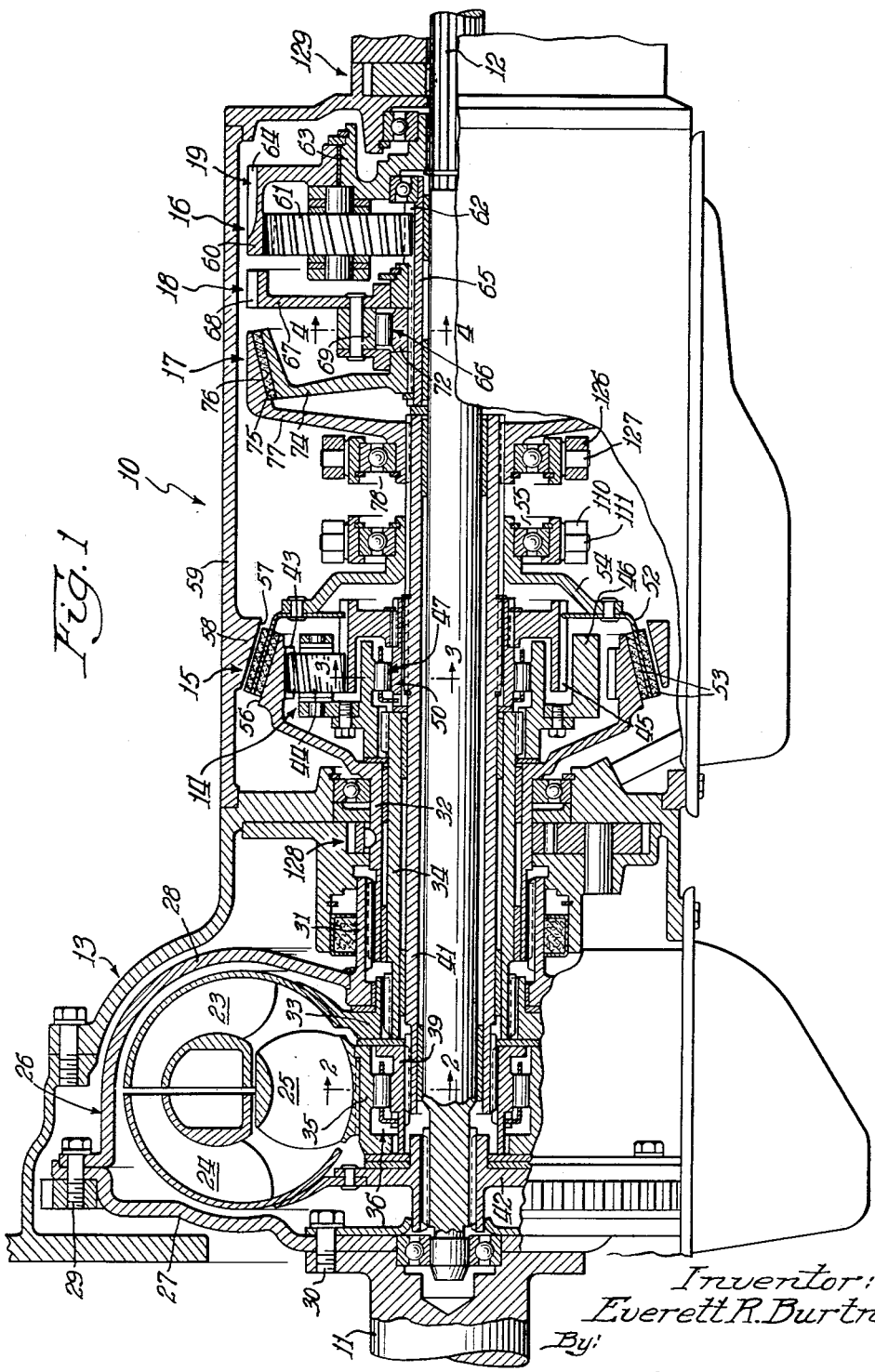
Inventor:
Everett R. Burtnett
By:
Keith J. Bleuer Atty.

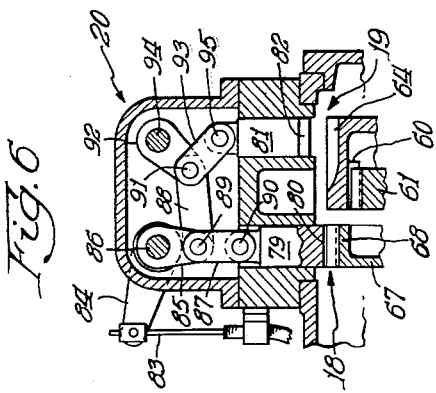

Inventor:
Everett R. Burtnett

United States Patent Office 2,995,954
Patented Aug. 15, 1961

2,995,954
POWER TRANSMITTING MECHANISM
Everett R. Burtnett, China Lake, Calif., assignor to Borg-Warner Corporation, Chicago, Ill., a corporation of Illinois
Filed Mar. 9, 1956, Ser. No. 597,112
(Filed under Rule 47(b) and 35 U.S.C. 118)
3 Claims. (Cl. 74—677)

The invention relates to transmission mechanisms and more particularly to such mechanisms as are especially useful in automotive vehicles.

The transmission mechanism of the invention constitutes an improvement of the transmission mechanism shown in issued Patent No. 2,592,538, issued April 15, 1952, for a "Power Transmitting Mechanism." In the power transmitting mechanism of said prior patent, a low speed forward drive power train is completed by means of a friction brake, with the power flowing through both a hydrodynamic torque converter and a planetary gear set in tandem with the torque converter.

It is an object of the present invention to provide, in lieu of the friction brake, a positive type brake and a one-way brake connected in series, so that the low speed power train drives in only the forward direction.

It is also an object to provide dual position combination clutch and brake so arranged that when in its braking condition it is in parallel with the positive and one-way brakes, so that a continuous low speed power train is maintained in both directions between the vehicle engine and the driving road wheels.

In the said prior patent, a second planetary gear set is provided having a clutch associated therewith for locking up said planetary gear set so that all of its elements rotate as a unit for providing a high speed drive. It is an object of the present invention, in lieu of providing such a clutch, to construct and arrange the combination clutch and brake referred to above with two operative positions. In one position, it will be effective to take reaction from the planetary gear set for the low speed forward drive, and in the other position, it connects two elements of the associated planetary gear set together so as to provide a high speed drive through the transmission.

It is a further object of my invention to utilize the second planetary gear set mentioned in connection with my prior patent for providing a reverse drive through the transmission; this second gear set being rendered operative by a positive brake associated with the gear set. In this regard, it is an object to provide a parking condition by means of a one-way engaging device associated with this second planetary gear set which will positively lock the driven shaft against rotation in one direction. This one-way device is also to provide a train from one element of the second planet gear set to the drive shaft of the transmission so that the compression of the vehicle engine connected with the drive shaft prevents rotation of the last-named element of the second planet gear set in the other direction.

It is also an object to provide in connection with the dual position friction engaging device, referred to above, a fluid pressure actuated servo motor which functions to disengage the friction device when fluid pressure is applied thereto. In conjunction with this servo motor, it is an object to provide a source of fluid pressure driven by the driven shaft of the transmission so that this friction device can be neutralized when the vehicle is being towed or pushed so that the vehicle engine is not driven thereby.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 1 is a longitudinal sectional view of a transmission embodying the principles of the invention;

FIGS. 2, 3 and 4 are sectional views taken respectively of lines 2—2, 3—3 and 4—4 of FIG. 1 in the directions indicated;

FIG. 5 is a sectional view of a fluid pressure responsive servo motor for actuating the dual position friction engaging device in the transmission;

FIG. 6 is a sectional view of actuating mechanism for the two positive brakes of the transmission for completing respectively forward and reverse drives;

FIG. 7 is a sectional view of a vacuum responsive servo motor for actuating the rear friction engaging device in the transmission.

Like characters of reference designate like parts in the several views.

Figure 8:
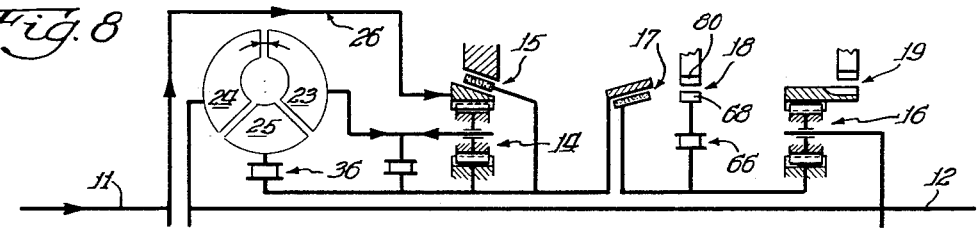
FIGS. 8, 9, 10, 11, and 12 are schematic diagrams of the transmission showing respectively in FIGS. 8 to 11 its neutral, low, high and reverse drive conditions, and showing in FIG. 12 a parking condition for a modification of the invention.
Figure 9:
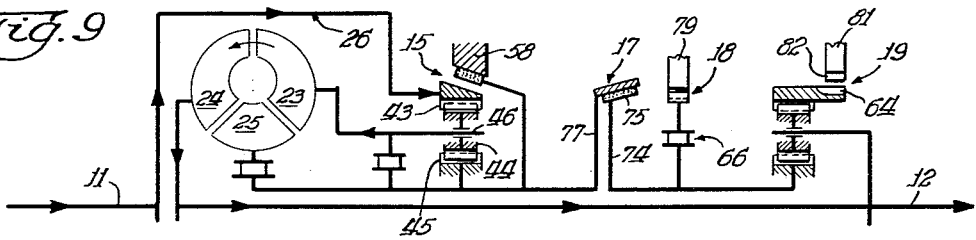
Figure 10:
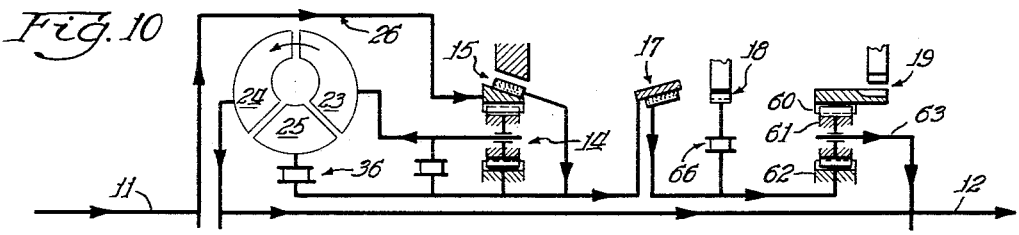
Figure 11:
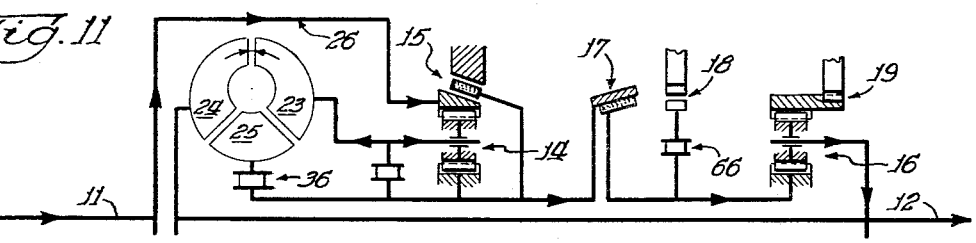

Referring to the drawings, the transmission mechanism 10 embodying the principles of my invention is shown as it is used in an automotive vehicle. The transmission mechanism 10 includes a drive shaft 11 and a driven shaft or load shaft 12, the former of which is adapted to be connected to the crankshaft of the vehicle engine and the latter of which is adapted to be connected to the driving road wheels of the vehicle through any suitable means (not shown).

The transmission mechanism 10, as a whole, comprises a hydraulic torque converter 13, a front torque multiplying planetary gear unit 14, a front cone clutch 15 which also at times acts as a brake, a rear torque multiplying planetary gear unit 16, a rear cone clutch 17, a forward drive positive brake 18, a reverse drive positive brake 19, an operating mechanism 20 for the front and reverse drive positive brakes 18 and 19, a servo motor 21 for the front cone clutch 15, and a servo motor 22 for the rear cone clutch 17.

The torque converter 13 is of conventional construction and comprises a bladed driving element or impeller 23, a bladed driven element or turbine 24, and a bladed stator 25 all enclosed in a fluid housing 26. The housing 26 has sections 27 and 28 which are fastened together by machine screws 29. The section 27 is also fastened to the drive shaft 11 by machine screws 30. The section 28 is also welded to a hub 31 which in turn is splined to a sleeve shaft 32. The impeller 23 is fastened to a hub 33 which in turn is splined to a sleeve shaft 34 journalled inside the sleeve shaft 32. The stator 25 is fastened to a hub 35 which forms an external part of a one-way brake 36. The brake 36 comprises an internal cylindrical surface 37 formed in the hub 35, a plurality of rollers 38 interposed between the surface 37 and an internal hub 39 formed with a cam 40 for each of the rollers 38. The hub 39 is splined to a sleeve shaft 41 which is journalled inside the sleeve shafts 34 and 32. The turbine 24 is fastened to a hub 42 which is splined to the driven shaft 12. The driven shaft 12 is journalled inside the concentric sleeve shafts 41, 34 and 32.

The front planetary gear unit 14 comprises a ring gear 43 which is integral with the sleeve shaft 32, a plurality of planet gears 44, and a sun gear 45. The planet gears 44 are in mesh with the ring gear 43 and the sun gear 45 and are carried by a planet carrier 46 which is splined to the sleeve shaft 34. The planet carrier 46 also forms an external part of a one-way clutch 47. The clutch 47 comprises an internal cylindrical surface 48 formed in the carrier 46, a plurality of rollers 49 interposed between the surface 48 and an internal hub 50 which has a cam 51 for each of the rollers 49. The hub 50 is splined to the sleeve shaft 41 and to the sun gear 45.

The front one clutch 15 is double acting and comprises a cone clutch plate 52 splined for axial movement to the sun gear 45 of the front planetary gear unit 14 and having friction facings 53, an annular connecting member 54 fastened to the plate 52, and a bearing 55 disposed on and fixed to the member 54. The plate 52 is adapted to be engaged with an external conical surface 56 on the ring gear 43 of the front planetary gear unit 14 and is also adapted to be engaged with an internal conical surface 57 of an annular portion 58 of a casing 59 for the transmission mechanism 10.

The rear planetary gear unit 16 comprises a ring gear 60, a plurality of planet gears 61, and a sun gear 62. The planet gears 61 are in mesh with the ring gear 60 and with the sun gear 62 and are carried by a planet carrier 63 which is splined to the driven shaft 12. The ring gear 60 has external teeth 64 constituting a part of the reverse drive positive brake 19. The sun gear 62 is integral with a sleeve shaft 65 which is journalled about the drive shaft 12. The sleeve shaft 65 is held stationary at times by means of the forward drive positive brake 18 acting through a one-way brake 66.

The brake 18 comprises a disc 67, having external teeth 68, which is fastened to a hub 69 forming an external part of the one-way brake 66. The one-way brake 66 comprises an internal cylindrical surface 70 formed within the hub 69, a plurality of rollers 71 interposed between the surface 70 and an internal hub 72 which has a cam 73 for each of the rollers 71. The hub 72 is splined to the sleeve shaft 65 which is integral with the sun gear 62.

The rear cone clutch 17 comprises a coned plate 74 splined to the sleeve shaft 65 and having an external friction facing 75 for engaging an internal conical surface 76 of a correspondingly coned annular clutch member 77. The member 77 is splined for axial movement to the sleeve shaft 41 and carries a bearing 78 by means of which the member 77 may be moved axially on the sleeve shaft 41.

The forward drive positive brake 18 comprises a pawl 79 having a tooth 80 adapted to be engaged with the external teeth 68 of the disc 67.

The reverse drive positive brake 19 comprises a pawl 81 having a tooth 82 adapted to be engaged with the external teeth 64 on the ring gear 60 of the rear planetary gear unit 16.

The operating mechanisms 20 effectively engages and disengages the brakes 18 and 19 and comprises a manually operated cable 83 which is attached to a lever arm 84 in turn affixed to another shorter arm 85 both of which arms are free to turn about a fixed pin 86. Two links 87 and 88 are attached to the arm 85 by a pin 89. The link 87 is connected to the pawl 79 by means of a pin 90. The link 88 is connected by means of a pin 91 to a link 92 and a link 93. The link 92 is free to turn about a fixed pin 94, and the link 93 is connected to the pawl 81 by a pin 95. It will be noted that the link 88 is shorter than the distance between the pawls 79 and 81 for purposes which will be hereinafter described.

The servo-motor 21 for actuating the front cone clutch 15 comprises a casing 96 having therein two cylindrical cavities 97 and 98. Pistons 99 and 100 are respectively positioned in the cavities 97 and 98 and are connected together by a rod 101. The rod 101 is fixed with respect to the pistons 99 and has a lost motion connection 102 with the piston 100. The lost motion connection is provided by an aperture 103 in the piston 100 into which an extension 104 of reduced diameter of the rod 101 extends. A spring 105 acts on the piston 99 yieldably holding the pistons 99 and 100 in their illustrated positions. A shoulder 106 is provided within the cylindrical cavity 98 for limiting the movement of the piston 100 to the left as shown in the drawings.

A lever 107, pivoted on a stud 108, is provided for effectively connecting the pistons 99 and 100 with the bearing 55. One end of the lever 107 is disposed in a slot 109 provided in the rod 101, and the other end of the lever 107 is connected with the bearing 55 by means of a trunnion 110 pivotally attached to the bearing 55 by means of studs 111 extending through opposite arms of the trunnion 110. Fluid pressure may be admitted into the cavity 97 through an opening 112 for moving the piston 99 to the left. Fluid pressure may be admitted into the cavity 98 through an opening 113 for moving the piston 100 to the left.

The servo-mechanism 22 for actuating the rear cone clutch 17 comprises a vacuum actuated piston 114 within a casing 115, a lever 116 rotatably disposed on a stud 117 and a spring 118 which together with the piston 114 acts on the lever 116. A rigid extension 119 of the casing 115 is connected to a stationary anchor member 120 by a pin 121 for allowing slight swinging movement of the casing 115. The spring 118 is connected at one end to a fixed anchor member 122 and at its other end to both the lever 116 and a connecting rod 123 affixed to the piston 114. The piston 114 is slidable within a cylindrical cavity 124 in the casing 115, and vacuum may be applied on the piston 114 through a vent 125. A trunnion 126 on the lever 116 is pivotally attached to a pair of studs 127 provided on the bearing 78 for moving the member 77 of the cone clutch 17.

A front oil pump 128 of any suitable construction is provided for supplying fluid pressure to the servo-motor 21 as soon as the vehicle engine is started. A similar rear oil pump 129, driven by the load shaft 12, is provided for alternately supplying fluid pressure to the servo-motor 21 as soon as the vehicle is set in motion.

The transmission mechanism 10 may have a neutral condition and three driving conditions, namely, low gear forward drive, high gear forward drive and reverse drive. The neutral condition and these three driving conditions are respectively shown schematically in FIGS. 8, 9, 10 and 11 which help to illustrate the power trains existing for these conditions.

The transmission mechanism 10 is in neutral condition when both of the brakes 18 and 19 are disengaged, the clutch 17 is disengaged, and the clutch 15 is disengaged with respect to both of its coned surfaces 56 and 57. When the engine is in operation, the drive shaft 11 is driven and drives through the fluid housing 26, the hub 31, and the sleeve shaft 32 to the ring gear 43 of the front planetary gear unit 14. The ring gear 43 tends to drive the planet gears 44, the planet carrier 46, the sleeve shaft 34, the hub 33, and the impeller 23; however, the sun gear 45 is free and, therefore, no reaction is provided for the front gear set 14 so that the sun gear 46 rotates idly. Therefore, there is substantially no rotation of the impeller 23 and, consequently, no rotation of the turbine 24 and driven shaft 12.

As will be hereinafter explained, the sun gear 45 is at times held stationary, by means of the clutch 15 to obtain various drives through the transmission; however, for neutral condition, this clutch is disengaged. The sun gear 45 at times is also held stationary by means of the clutch 17 acting through the sleeve shaft 41 and the hub 50; however, the clutch 17 for neutral condition is also disengaged.

In neutral condition, the clutch 15 is maintained out of engagement with the conical surfaces 56 and 57 by means of the piston 100. Fluid pressure is applied on the piston 100 through the port 113, thereby moving the piston 100 and the piston 99, connected therewith by means of the connecting rod 101, against the action of the spring 105 until the piston 100 abuts the shoulder 106. The piston 100 in thus moving turns the lever 107 counterclockwise about the stud 108 and moves the clutch plate 52 into a neutral position; that is, out of engagement with both the conical clutch surfaces 56 and 57.

The clutch 17 may be disengaged by applying vacuum, as from the intake manifold of the vehicle engine (not shown) on the piston 114 through the port 125. Vacuum applied on the piston 114 moves the piston and its connecting rod 123 to the right against the force of the spring 118, thereby turning the lever 116 counter-clockwise and moving the bearing 78 and the clutch member 77 so as to disengage the member 77 from the member 74.

The low speed forward drive power train may be completed by engaging the brake 18 at a time when the clutch 17 is out of engagement. The brake 18 may be engaged by actuating the cable 83 in such a manner as to rotate the lever 84 counterclockwise about the pin 86 so as to align the links 85 and 87. Alignment of the latter two links moves the pawls 79 into engagement with the teeth 68 on the disc 67. Subsequently, the clutch 17 is engaged by venting the cylinder 124 and releasing the vacuum within the cylinder. The spring 118, then acting on the lever 116, is effective to move the lever 116 in a counterclockwise direction so as to reengage the clutch 17. The power then flows from the drive shaft 11 through the torque converter housing 26, the hub 31, the sleeve shaft 32, the ring gear 43, the planet gears 44, the planet carrier 46, the sleeve shaft 34, the hub 33, the impeller 23, the turbine 24, the hub 42, and the driven shaft 12. The planetary gear set 14 multiplies the torque from the engine and, therefore, drives the impeller 23 at a reduced speed and increased torque. This torque from the impeller 23 is multiplied again in the torque converter 13 so that the turbine 24 is driven at a correspondingly increased torque. The sun gear 45 of the planetary gear set 14 is held stationary so as to take reaction in providing this torque multiplication in the gear set 14; the sun gear being held stationary through the sleeve shaft 41, the clutch 17, the one-way brake 66, and the positive brake 18. The hydraulic torque converter 13 also multiplies torque due to the action of the fluid circulating within the torque converter and because the stator 25 is held stationary and takes reaction from the fluid. The stator 25 is held stationary through the one-way brake 36 and the sleeve shaft 41; the shaft 41 being held stationary by the positive brake 18 as just described.

As is well known, in connection with a hydraulic torque converter of the type disclosed, when the speed of the turbine 24 reaches a predetermined value, the force of the fluid on the stator 25 changes direction, tending to rotate the stator in the forward direction instead of in the reverse direction. When this occurs, the one-way brake 36 releases and allows free forward rotation of the stator 25 so that the torque converter 13 subsequently functions as a simple non-torque multiplying fluid coupling.

As has just been described, the reaction of the sun gear 45 and the reaction of the stator 25 is taken through the one-way engaging device 66 and the forward drive positive brfake 18; therefore, when the vehicle tends to run ahead of the vehicle engine, as for example, when the vehicle is descending a grade, the one-way device 66 will release and the driven shaft 12 will rotate freely without any braking action by the vehicle engine. If it is desired that such braking action exists, the clutch 15 is engaged with the conical clutch surface 57. This may be accomplished by applying fluid pressure on the piston 99 through the port 112, moving the piston 99 to the left. Such movement of the piston 99 rotates the lever 107 farther in the counter-clockwise direction, thereby moving the bearing 55 and moving the clutch plate 52 into engagement with the conical casing surface 57. In this position, the clutch 15 will hold the sun gear 45 regardless of the direction of torque on the sun gear so that the low speed power train will remain completed (except for any free-wheeling action of the stator 25 due to the one-way brake 36), and a substantial engine braking effect will be effective on the driven shaft 12 and the vehicle.

The transmission may be shifted from its low speed to its high speed drive by engaging the clutch disc 52 with the conical clutch surface 56 of the ring gear 43. This may be accomplished by bleeding the fluid pressure from the cylinders 97 and 98, thereby allowing the spring 105 to move the pistons 99 and 100 and the rod 101 to the right to the limit of their movement; this movement being transmitted through the lever 107 causing the lever to turn clockwise and moving the clutch plate 52 into engagement with the ring gear 43. In this position the clutch plate 52 locks the ring gear and the sun gear together so that all of the elements of the gear unit 14 rotate as a unit. The drive shaft 10 is thereby, in effect, directly connected to the driven shaft 12 through the planetary gear set 14; therefore, the impeller 23 and the driven shaft 12 rotate at the speed of the drive shaft 10 in lieu of the reduced speed provided by the gear set 14 when its sun gear 45 is braked. The turbine 24 and the driven shaft 12 are thus driven at a relatively high speed ratio. It should be noted that the brake 18 continues to take the reaction for the low speed drive until the clutch disc 52 actually engaged the conical clutch face 56. This is so, regardless of whether the clutch disc 52 is moved from a braking position, that is, engaged with the conical surface 57, or from an intermediate position between the conical surfaces 56 and 57, thus assuring that there is no cessation of drive nor is there engine raceway when shifting from low speed ratio to high speed ratio.

The reverse drive through the transmission may be completed by rotating the lever 84 counter-clockwise by means of the cable 83 so as to break the links 85 and 87. This has the effect of pulling the pawl 79 out of engagement with the disc 67. The link 88 connected with the pin 89 moves the links 92 and 93 into alignment thereby moving the pawl 81 into engagement with the teeth 64 on the ring gear 60 of the rear planetary gear unit 16. It is assumed that the clutch 17 is disengaged when the brake 18 is being disengaged and the brake 19 is being engaged, and the clutch 17 is then subsequently re-engaged to complete the reverse drive power train. The clutch 15 for reverse drive is in its intermediate position, that is, disengaged with respect to both the coned surfaces 56 and 57.

For reverse drive, the drive shaft 11 drives the housing 26, the hub 31, the sleeve shaft 32, and the ring gear 43. The carrier 46 of the planet gear set 14 is connected through the sleeve shaft 34 with the impeller 23 which provides a load on the carrier 46 so that the planet gears 44 tend to cause the sun gear 45 to rotate in the reverse direction. The sun gear 45, being fixed to the sleeve shaft 41, tends to rotate the shaft 41 in the reverse direction. The shaft 41 is connected through the clutch 17 with the sun gear 62. The ring gear 60 is locked from rotation by means of the positive brake 19 and therefore forms a reaction for the gear set 16 and the planet gears 61 and carrier 63 are thus driven in the reverse direction at a reduced speed and increased torque with respect to the sun gear 62. The driven shaft 12 being fixed with respect to the carrier 63 as above described is thus also driven in the reverse direction at increased torque.

The hydraulic torque converter 13 functions to provide a path in parallel with the sun gear 45 for driving the sleeve shaft 41 in the reverse direction. As mentioned above, the carrier 46 of the planet gear set 14 tends to drive the impeller 23, this drive being in the forward direction; however, the turbine 24 is fixed with respect to the driven shaft 12, so that the net result in the torque converter 13 is an application of torque on the stator 25 in the reverse direction. The stator 25 thus tends to drive the sleeve shaft 41 in the reverse direction through the one-way engaging device 36, providing a second means for driving the shaft 41 in the reverse direction in addition to the sun gear 45. As the vehicle begins to move in the reverse direction, the turbine 24, fixed with respect to the driven shaft 12, will tend to pump fluid in the reverse direction, thereby increasing the force of reaction against the impeller 23. This reaction force against the impeller 23 will be transmitted back to the planet carrier 46 and to the planet gears 44, thereby increasing the torque delivered to the sun gear 45, and consequently increasing the efficiency of the reverse drive.

The reverse drive positive brake 19 functions as a parking gear when the vehicle and engine are at rest. In this condition, the spring 118 will hold the rear cone clutch 17 engaged, and the spring 105 will hold the front cone clutch 15 engaged with the ring gear 43 of the front planetary gear unit 14. Since the ring gear 60 of the rear planetary unit 16 is locked by the brake 19 against rotation in either direction, any tendency of the vehicle to move in either direction will be transmitted in turn through the driven shaft 12, the rear planet carrier 63, the planet gears 61, the sun gear 62, the sleeve shaft 65, the rear clutch 17, the sleeve shaft 41, the front planetary gear unit 14, the sleeve shaft 32, the hub 31, the housing 26, and the drive shaft 11 to the vehicle engine. This power train will be continuous in either direction and the braking force of the vehicle engine will prevent movement of the vehicle either forwardly or rearwardly.

The front oil pump 128 is driven by torque from the vehicle engine through the drive shaft 11, the fluid housing 26, the hub 31, and the sleeve shaft 32. This pump 128 will be inoperative when the vehicle engine is inoperative. The rear oil pump 129 is driven directly by the driven shaft 12 and will be operative only when the vehicle is in motion. The rear pump 129 may be connected in any suitable manner with the fluid pump 128 for providing fluid pressure for actuating the pistons 99 and 100. When the vehicle is being towed or pushed in neutral with both brakes 18 and 19 disengaged and with the vehicle engine at rest, the rear pump 129 may supply fluid pressure to the servo mechanism 21 so that the clutch 15 may be held in its intermediate position; that is, disengaged with respect to both of the surfaces 56 and 57, so that there is no completed power train through the transmission from the driven shaft 12 to the drive shaft 11.

The vehicle engine may be started by pushing the vehicle with the transmission set in high speed gear ratio. In this condition, the spring 118 will hold the rear clutch 17 engaged, and the spring 105 will hold the front clutch 15 engaged with the ring gear 43 of the front planetary unit 14; the planetary gear set 14 being thus locked to rotate as a unit. The power train will then be through the driven shaft 12, the hub 42, the turbine 24, the impeller 23, the hub 33, the sleeve shaft 34, the planetary gear unit 14, the sleeve shaft 32, the hub 31, the fluid housing 26, and the drive shaft 11 to the vehicle engine.

Figure 12:
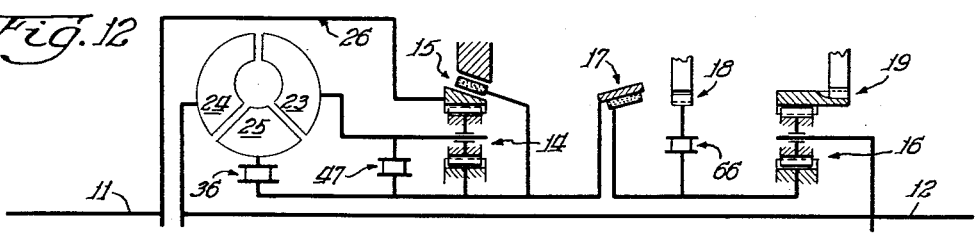

The one-way engaging device 47 has no particular usefulness for the drives above described; however, it is useful for providing a braking condition for the transmission when certain of the operators for the clutches and brakes are dispensed with (see FIG. 12 for an illustration of this braking condition). It is contemplated that the operating mechanism 20 for the positive brakes 18 and 19 and the servo motor 21 for the clutch 15 may be omitted, utilizing only the servo motor 22 for the clutch 17. With these changes, the clutch 15 will be disengaged from its cone engaging surfaces 56 and 57 when the engine is inoperative, and the spring 118 will be effective to hold the clutch 17 engaged under these conditions. It is contemplated that both of the brakes 18 and 19 may be simultaneously engaged in order to provide the braking condition just mentioned in which the driven shaft 12 is in effect, directly connected through the one-way engaging device 47 with the drive shaft 11.

Assuming that the clutch 17 is maintained engaged by the spring 118 and that the pawls 79 and 81, respectively, are simultaneously engaged with the teeth 68 and the teeth 64, then a tendency of the vehicle to move rearwardly will tend to cause a reverse rotation of the driven shaft 12 which will in turn tend to cause a reverse rotation of the gear carrier 63 of the rear gear set 16. Both the ring gear 60 and the sun gear 62 are held against movement in the reverse directions as will be hereinafter described; therefore, the carrier 63 and the driven shaft 12 will also be held against rotation. The pawl 81 engaging the teeth 64 holds the ring gear 60 from rotation in either direction. The sun gear 62 is held from reverse rotation by means of the sleeve shaft 65, the one-way engaging device 66 and the brake 18, the one-way device 66 being engaged for this tendency of rotation of the sun gear 62. Since the sun gear 62, the ring gear 60, the carrier 63, and the driven shaft 12 are all locked against rotation in the reverse direction, the vehicle cannot roll backwardly.

The brake 19 holds the ring gear 60 from rotation in the forward direction as well as in the reverse direction. A tendency for the sun gear 62 to rotate forwardly is transmitted through the sleeve shaft 65, the clutch 17, the sleeve shaft 41, and the hub 50 to the sun gear 45 of the planetary gear set 14 so that the sun gear 45 tends to rotate forwardly. The hub 50 also transmits this tendency to rotate forwardly through the one-way clutch 47 to the carrier 46 of the gear set 14, so that the two elements of the gear set 14, namely, the sun gear 45 and the carrier 46 tend to rotate forwardly. The planet gear set 14 is thus locked up for this direction of rotation so that all of its elements tend to rotate as a unit; thus the ring gear 43 is, in effect, directly connected with the shaft 41 through the gear set 14. The ring gear 43 is in turn connected with the drive shaft 11 of the vehicle engine through the sleeve shaft 32 and the housing 26. Thus the clutch 47, in connection with the other parts just mentioned, holds the sun gear 62 of the rear gear set 16 against rotation in the forward direction against the compression of the engine. Since the driven shaft 12 is thus held against rotation in the forward direction as well as in the reverse direction, the vehicle cannot roll forwardly or rearwardly.

My improved invention advantageously provides a low speed forward drive which includes both the hydrodynamic torque converter 13 and the front planetary gear set 14 to transfer power from the drive shaft to the driven shaft and completed by the forward drive positive brake 18 and the one-way brake 66. A two-way low speed drive is obtained by engaging the clutch disc 52 with the coned surface 57, and a high speed drive, which also includes the torque converter 13 and the front planetary unit 14, is obtained by moving the clutch disc 52 into its other position of engagement with the coned friction surface 56. Since the positive brake 18 and the one-way device 66 complete a low speed drive, there is no cessation of power while the clutch disc 52 is being moved from its low speed drive position to its high speed drive position. The rear planetary gear set 16 provides a reverse drive in conjunction with the other parts of the transmission, and the two positive brakes 18 and 19, which when simultaneously engaged or with the brake 19 alone engaged, provide a braking condition preventing movement of the vehicle in either direction. This braking condition is obtained when the clutch 15 is in its neutral position and the clutch 17 is engaged and the driven shaft 12 is held against the compression of the vehicle engine from rotation in the forward direction due to the action of the one-way unit 47, completing a power train between the shafts 12 and 11.

I wish it to be understood that my invention is not to be limited to the specific constructions and arrangements shown and described, except only insofar as the claims may be so limited, as it will be understood to those skilled in the arts that changes may be made without departing from the principles of the invention.

I claim:

1. In a transmission mechanism for an automotive vehicle having a driving engine, the combination of a drive shaft adapted to be driven by said engine, a driven shaft, means for providing a forward drive power train between said shafts and including a positive brake and a one-way brake connected in series for taking reaction and making the power train effective, means for providing a reverse drive power train between said shafts and including a positive brake for making the power train effective, said positive brakes when both are engaged being effective to hold said driven shaft from rotation in one direction, and means for holding said driven shaft against rotation in the other direction against the compression of the vehicle engine and including a one-way engaging device which completes a power train from said driven shaft to said drive shaft when both of said positive brakes are engaged.

2. In a transmission mechanism for an automotive vehicle having a driving engine, the combination of a drive shaft adapted to be driven by said engine, a driven shaft, means including planetary gearing for providing a forward drive power train between said shafts and including a positive brake and a one-way brake connected in series for taking reaction of said planetary gearing and making the power train effective, means for prividing a reverse drive power train between said shafts and including a planetary gear set having three interconnected drive and drive receiving elements, one of which is connected with said driven shaft, a positive brake for a second of said elements for making said reverse drive power train effective, the third of said elements being connected with said one-way brake so that said two positive brakes when they are simultaneously engaged prevent rotation of two of the elements of said gear set in one direction and thereby prevent rotation of said driven shaft in one direction for holding the vehicle from movement in one direction when parked, and means for preventing said third element of said gear set from rotating in the opposite direction and including a one-way engaging device for locking up said first named planetary gearing and completing a power train from said third element to said drive shaft so that the compression of said engine brakes said third element from rotation in said opposite direction whereby said planetary gear set is effective when said brakes are engaged for preventing rotation of said driven shaft in both directions.

3. In a transmission mechanism for an automotive vehicle having a driving engine, the combination of a drive shaft adapted to be driven by said vehicle engine, a driven shaft, means for providing a low speed power train from said drive shaft to said driven shaft and including a planetary gear set and a braking mechanism, said planetary gear set comprising a ring gear element and a sun gear element and planet gears in mesh with said ring gear and sun gear elements and a planet gear carrier element, means for driving said ring gear element from said drive shaft, a hydraulic torque converter for providing a driving connection between said carrier element and said driven shaft, said braking mechanism comprising a positive type brake and a one-way brake and a friction clutch all connected in series and effective on said sun gear element for taking the reaction of the planetary gear set and making said low speed drive effective, means for providing a reverse drive power train between said shafts and including a second planet gear set comprising a ring gear and a sun gear and planet gears in mesh with said sun and ring gears and a planet gear carrier, said carrier being connected to said driven shaft and said sun gear being connected through said friction clutch with said sun gear element of said first gear set, a positive type brake for said ring gear, said torque converter being operative in reverse drive for restraining rotation of said carrier element of said first gear set, said positive type brake for said ring gear making effective the reverse drive power train from said drive shaft through said ring gear element and said sun gear element of said first planetary gear set to said sun gear of said second gear set and through said latter gear set to said driven shaft, said braking mechanism preventing rotation of said sun gear of said second gear set in the reverse direction and cooperating with said positive type brake for said ring gear when both brakes are engaged for preventing reverse rotation of said driven shaft and consequent reverse movement of the vehicle from a parked condition, and means for also preventing forward rotation due to vehicle engine compression of said last-named sun gear and including a one-way engaging device disposed between two of said elements of said first gear set for completing a substantial one-to-one power train from said sun gear of said second gear set to said drive shaft so that said driven shaft is prevented from rotation in the forward direction and said vehicle is prevented from forward movement out of a parked condition.

References Cited in the file of this patent

UNITED STATES PATENTS

| | | |
|---|---|---|
| 2,097,021 | De Normanville | Oct. 26, 1937 |
| 2,115,963 | Osborne | May 3, 1938 |
| 2,136,971 | Fleischel | Nov. 15, 1938 |
| 2,270,536 | Lenning | Jan. 20, 1942 |
| 2,293,358 | Pollard | Aug. 18, 1942 |
| 2,566,518 | Farkas | Sept. 4, 1951 |
| 2,612,791 | Miller et al. | Oct. 7, 1952 |
| 2,674,356 | Eason | Apr. 6, 1954 |
| 2,682,786 | Flinn | July 6, 1954 |
| 2,695,533 | Pollard | Nov. 30, 1954 |
| 2,716,359 | Forster | Aug. 30, 1955 |
| 2,771,974 | Mooney | Nov. 27, 1956 |

FOREIGN PATENTS

| | | |
|---|---|---|
| 702,054 | Great Britain | Jan. 6, 1954 |